3,001,984
PROCESS FOR PREPARING NITRIC ACID
ESTERS OF CELLULOSE
Ira T. Clark, 119 Ash St., and Merrill A. Millett,
322 N. Hillside Terrace, both of Madison, Wis.
No Drawing. Filed Nov. 27, 1959, Ser. No. 855,947
8 Claims. (Cl. 260—220)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

The patent rights for the United States in any invention in the patent to be granted on this application are dedicated to the public.

This invention relates to a process for preparing nitric acid esters of cellulose which are stable in use and in storage against self initiation of the hazards of fire and explosion, and has among its objects the provision of such a process which is simple in operation, economical in time and expense, relatively mild in character so as to cause only minor degradation of the cellulose molecule resulting in an ester of high average molecular weight, and which permits safe handling of the hazardous materials during the course of carrying out the process. Other objects will be apparent from the description of the invention.

We have discovered that a unique nitrating mixture containing anhydrous hydrogen fluoride and anhydrous nitrogen tetroxide in certain proportions and under certain conditions of reaction, rapidly penetrates and completely reacts with cellulose to form nitric acid esters of cellulose. Anhydrous hydrogen fluoride alone is well known to penetrate cellulose structure rapidly, relaxing physical and/or chemical bonds between fibrils and molecules, swelling cellulose fibers, and eventually depolymerizing and dissolving the cellulose. We have found that such a nitrating mixture containing anhydrous hydrogen fluoride and anhydrous nitrogen tetroxide effectively uses the penetrating properties of the hydrogen fluoride to introduce nitrogen tetroxide into the interior molecular structure of the cellulose, and, as a result, newly exposed hydroxyl groups are then rapidly and uniformly nitrated and rendered insoluble in the mixed nitrating acid with minimum degradation of the cellulose polymer.

A specific feature of this invention is its use of the affinity of anhydrous hydrogen fluoride for water to remove from the molecular sites the water formed during the nitration. It is well known that water formed in an esterification, which is an equilibrium reaction, dilutes the reagents and prevents the reaction from approaching completion. In this invention, the nitration is accomplished rapidly and completely because of the speed and effectiveness with which the anhydrous hydrogen fluoride reacts with the water to form complex compounds from which water cannot be freed to interfere with the nitration, or to hydrolyze and degrade the nitrocellulose.

It is well known that nitrogen tetroxide exists in equilibrium with nitrogen dioxide, and that these two oxides may undergo spontaneous interconversion to other nitrogen oxides, depending upon existing temperature and pressure conditions. Accordingly, since any or all of these nitrogen oxides may be present in inexactly known proportions in the nitrating mixture employed in this invention and since they may participate in the conversion of cellulose to its nitric acid esters, the term "nitrogen tetroxide" is used in the instant specification and claims to include nitrogen tetroxide and all of these other nitrogen oxides.

Also, since it is well known that anhydrous hydrogen fluoride is a strongly acidic substance that reacts with or forms complex molecular compounds with many less acidic substances, including water, such complex compounds formed with the nitrogen oxides or with other substances may be present in the mixed acid employed in the nitrating mixture and may participate in, or otherwise effect, the conversion of cellulose to its nitric acid esters. Accordingly, the term "anhydrous hydrogen fluoride" is used in the instant specification and claims to include anhydrous hydrogen fluoride and the complex compounds which may be formed therewith in the nitrating medium.

In general, according to the invention, cellulose is reacted with, as by immersion in, a nitrating mixture obtained by combining about from 10% to 50%, by weight, of anhydrous nitrogen tetroxide with about from 90% to 50%, by weight, of anhydrous hydrogen fluoride, employing a ratio of about from 10 to 175 parts, by weight, of nitrating mixture to one part, by weight, of cellulose at a temperature of about from −50° C. to +50° C., until nitration is substantially complete.

The excess spent liquid nitrating mixture is then removed from the resulting acid-wet nitric acid esters of cellulose, as by centrifuging or squeezing, and the residual amount of the nitrating mixture adsorbed on the cellulose is thereafter removed therefrom, as by evaporation at less than atmospheric pressure or by sweeping it from the cellulose with a dry inert gas, such as air, or by a combination of these methods. Optionally, the evaporation procedure may be interrupted and removal of final traces of spent nitrating mixture from the nitric acid esters may be accomplished by water drowning and washing to neutrality. Complete recovery of the components of the nitrating mixture may be obtained by condensing them at temperatures below their boiling points. The above procedures of removing the spent nitrating mixture from the nitrocellulose may be carried out safely inasmuch as no unstable substances are formed during the nitration.

The nitric acid esters of cellulose thus produced, retain the fluffy character of cellulose, are obtainable in 97 to 99% yields, have an average degree of polymerization of about from 300 to 800, contain about from 11.0% to 13.5% nitrogen, by weight, are substantially completely soluble in acetone, and, without water washing or stabilization treatment, are stable for about 17 minutes as measured by the standard 134.5° C. heat test thereby meeting the minimum stability requirements as measured by the standard 134.5° C. heat stability test established by ASTM specification D301–33, Part II, of 1946. Greater stability may be attained by boiling one part of the acid-free nitric acid esters in about 25 parts of tap water for about 2 hours.

Acetone soluble nitric acid esters of cellulose of the higher molecular weights have special properties of cohesiveness and crystallinity that can lent advantages to special propellant substances or commercial nitrocellulose products into which they are incorporated.

Since the anhydrous nitrating mixture effectively removes water formed in the above-described process the hydrolysis effects during the reaction are held to a minimum. Because of this, and since lengthy stabilization treatments that degrade or depolymerize the nitric acid esters are not necessary, nitric acid esters of cellulose with an approximate average degree of polymerization of 750 to 850 are obtainable as desired. An advantage of this minimum degradation of the nitrocellulose product is that cellulose of a lower average molecular weight than it has hitherto been possible to use for this purpose may be converted to stable nitrocellulose of acceptable average molecular weight.

Cellulose in any convenient available form may be used for nitration in the process, including fibers, granules, sheets, and other forms, whether from wood, cotton, ramie, or other plant origin.

A wide range of mixed acid compositions and acid/cellulose ratios may be used. The nitrating mixture, however, must contain a suitable stoichiometric excess of anhydrous nitrogen tetroxide and of anhydrous hydrogen fluoride to accomplish the nitration effectively. Such an excess is the combination of about from 10% to 50%, by weight, of anhydrous nitrogen tetroxide with about from 90% to 50%, by weight, of anhydrous hydrogen fluoride. A preferred nitrating mixture is obtained by combining about from 20% to 40% of the nitrogen tetroxide with about from 80% to 60%, by weight, of the hydrogen fluoride. Water may be present in traces as an impurity.

The ratio of the nitrating mixture to cellulose should be about from 10 to 175 parts, by weight, of the nitrating mixture to one part, by weight, of cellulose, a preferred ratio ranging from about 20 to 80 parts, by weight, of the anhydrous nitrating mixture to 1 part, by weight, of cellulose.

The composition of the nitrating mixture, as well as the other conditions of the nitration reaction determine the properties of the nitric acid esters produced. For example, cotton linters, nitrated at −10° C. in a nitrating mixture that contains 30% anhydrous nitrogen tetroxide, has a greater nitrogen content and average molecular weight than those nitrated at 0° C. with 20% of the tetroxide in the nitrating mixture. Too great an excess of the anhydrous hydrogen fluoride can degrade the cellulose polymer before it is nitrated, and insufficient anhydrous hydrogen fluoride will result in an incomplete nitration. The composition of the nitrating mixture and/or its ratio to cellulose must be determined also by the physical bulk, density, and moisture content of the form and type of cellulose to be nitrated, by the average molecular weight, by the nitrogen content of the nitric acid esters of cellulose desired, and by consideration of the most practical and economical manufacturing operations possible.

The temperature range that may be used in the practice of this invention extends from about −50° C. to about 50° C., and includes conditions at which the nitrating media may be used as a liquid or as a vapor, depending upon the temperature used. Since the reaction rate decreases as the temperature decreases, the lower temperature limit is established by the point at which the rate becomes too slow to be practical and economical to use. With increases of the temperature, the reaction can become so rapid as to degrade the nitrocellulose product, and a useful upper temperature limit is established by practical considerations of regulating the exposure time of cellulose to the nitrating media in order to produce nitrocellulose of satisfactory quality without degrading it. A preferred range of temperature to use for the liquid anhydrous nitrating mixture is between about −20° C. and about 35° C. A preferred range of temperature for using a vapor form of the anhydrous nitrating mixture is between about 25° and about 35° C. One skilled in the art of this invention can select a suitable combination of temperature and duration of the nitration reaction that will produce uniformly and substantially completely nitrated nitric acid esters of cellulose.

The process of this invention can, because of the remarkable penetrating power of the nitrating mixture and the extremely rapid reaction that occurs, be advantageously adapted to a continuous operation in which cellulose in sheet or in bulk form is exposed countercurrentwise to the nitrating mixture in either a liquid or vapor form. Rapid, simple, and safe removal of the nitrating mixture can be accomplished and stabilization obtained by the methods previously described. Such continuous techniques of nitrocellulose production have not hitherto been possible because of long nitration time, hazards in removal of nitrating mixture, and long and involved stabilization procedures previously necessary to produce acceptable nitric acid esters of cellulose.

The following examples are illustrative of the invention. In these examples, stability was determined by the standard 134.5° C. heat test cited above, and the degree of polymerization (DP) was determined by measurement of viscosity of acetone solutions.

EXAMPLE NO. 1

A nitrating mixture was prepared by mixing in a polyethylene beaker about 30 percent by weight of liquid anhydrous nitrogen tetroxide and about 70 percent by weight of liquid anhydrous hydrogen fluoride and adjusting the temperature to 0° C. One part by weight of air-dried loose cotton linters was immersed in about 60 parts by weight of the nitrating mixture for 5 minutes with occasional gentle stirring. The nitric acid esters were separated by pouring the reaction mass on a stainless steel screen to drain off excess liquid spent nitrating acid. Additional liquid spent aced was separated by rolling the pulp with a Teflon roller on an inclined polyethylene sheet. The remaining adsorbed mixed acid was evaporated by exposing the pulp in an open hood draft for 2 hours. After this time it retained a slight odor of hydrogen fluoride, which was lost overnight. The white-colored product dissolved essentially completely in acetone forming a clear solution. A sample dried at about 40° C. for 1 hour gave a standard 134.5° C. stability test of 17 minutes. A sample dried at 105° C. for 1 hour contained 13.08 percent nitrogen. A degree of polymerization of 755 was calculated for the product from viscosity measurements of a 0.213 gram-per-deciliter solution in acetone. The yield of the nitric acid esters produced was 97.2 percent of theoretical based on the nitrogen content determined.

EXAMPLE NO. 2

A 3.9-gram quantity of ovendried shredded woodpulp that had a degree of polymerization of about 600, as determined by the 1 percent cupraethylenediamine viscosity method, was nitrated as in Example 1, and the pulp was freed of liquid acid as described therein. It was then placed in a stainless steel tube that was fitted with screened ends, and a current of air heated in 40° C. was passed through the nitrocellulose for 15 minutes. The visibly dry nitrocellulose was then drowned in 500 cubic centimeters of ice water without active reaction and washed free of acid. The nitrocellulose product contained 13.3 percent nitrogen by weight and had a degree of polymerization of 380. It had a stability of 17 minutes and was essentially completely soluble in acetone.

This experiment is described to illustrate the advantages of this invention in obtaining use of chemically pure cellulose, whose average molecular weight has been lowered by pulping processes to below that ordinarily possible to use in conventional processes for manufacturing nitric acid esters of cellulose.

EXAMPLES NOS. 3–8

In these experiments 4.0 grams of air-dried fluffed cotton linters of 4.8 percent moisture content were nitrated for 5 minutes at 0° C. in mixed acids of varying proportions of anhydrous nitrogen tetroxide and anhydrous hydrogen fluoride. After the nitration, the pulp was drained, squeezed free of excess spent acid, and drowned in 400 cubic centimeters of ice water. It was washed free of acid and air dried overnight. The data of these examples are listed in Table 1 hereafter.

EXAMPLES NOS. 9–20

Nitrocellulose was prepared from ovendried cotton linters using the procedure of Example 6 in a series of experiments in which the duration and the temperature of the reaction were varied. The data of these examples are described in Table 2 hereafter.

EXAMPLE NO. 21

Sheeted commercial pulp was nitrated by immersing 4.0 grams of the ovendried pulp, in the form of 2-inch squares approximately 0.03 inch thick, for ten minutes at 0° C. in a nitrating mixture consisting of about 30 percent of anhydrous nitrogen tetroxide and about 70 percent of anhydrous hydrogen fluoride. The squares were then drowned in 500 cubic centimeters of ice water, shredded in a Waring Blendor, washed free of acid, and air dried at room temperature overnight. The resulting nitric acid esters of cellulose had a nitrogen content of 12.43 percent by weight and were essentially completely soluble in acetone.

EXAMPLE NO. 22

Four grams of nitric acid ester prepared from cotton linters as in Example 6 were boiled for 2 hours in hard water (18 grains per gallon) and a stability of 30 minutes was obtained as determined by the standard 134.5° C. heat test.

Table 1

| Experiment No. | Composition of nitrating acid | | Weight ratio— Mixed acid/Cellulose | Nitrocellulose product | | | |
|---|---|---|---|---|---|---|---|
| | $N_2O_4$, Percent | HF, Percent | | Nitrogen, Percent | Stability, Minutes | DP | Acetone solubility |
| 3 | 10 | 90 | 175 | Below 10 | 17 | | Incomplete. |
| 4 | 20 | 80 | 88 | 12.32 | 23 | 615 | Complete. |
| 5 | 30 | 70 | 60 | 13.02 | 18 | 746 | Do. |
| 6 | 30 | 70 | 57 | 13.14 | 15 | 675 | Do. |
| 7 | 40 | 60 | 47 | 12.48 | 15 | 674 | Do. |
| 8 | 50 | 50 | 37 | 10.45 | 12 | | Incomplete. |

Table 2

| Experiment No. | Temperature, °C. | Time, Minutes | Nitrocellulose product | | | | |
|---|---|---|---|---|---|---|---|
| | | | Nitrogen, percent | DP | Stability, Minutes | Acetone solubility | Recovery, percent of theoretical |
| 9 | 0 | 3 | 12.72 | 675 | 18 | Complete | 101.6 |
| 10 | 0 | 7 | 13.14 | 700 | 15 | ...do | 98.7 |
| 11 | 0 | 12 | 13.38 | 755 | 17 | ...do | 97.2 |
| 12 | 0 | 22 | 13.50 | 815 | 17 | ...do | 99.1 |
| 13 | -10 | 7 | 12.93 | 715 | 17 | ...do | 100.6 |
| 14 | -10 | 12 | 13.02 | 690 | 17 | ...do | 99.7 |
| 15 | -10 | 22 | 13.27 | 750 | 17 | ...do | 101.0 |
| 16 | -10 | 42 | 13.50 | 870 | 17 | ...do | 100.6 |
| 17 | +12 | 3 | 12.88 | 554 | 16 | ...do | 96.7 |
| 18 | +12 | 7 | 13.29 | 475 | 16 | ...do | 98.2 |
| 19 | +12 | 12 | 13.44 | 530 | 16 | ...do | 99.3 |
| 20 | +12 | 22 | 13.56 | 586 | 15 | ...do | 98.6 |

What is claimed is:

1. A process of preparing a nitric acid ester of cellulose comprising reacting cellulose with a nitrating mixture obtained by combining about from 10% to 50%, by weight, of anhydrous nitrogen tetroxide with about from 90% to 50%, by weight, of anhydrous hydrogen fluoride, employing a ratio of about from 10 to 175 parts, by weight, of nitrating mixture to one part, by weight, of cellulose, at a temperature of about from −50° C. to 50° C., and removing all nitrating mixture from the resulting wet nitric acid ester of cellulose to obtain a nitric acid cellulose ester in a 97% to 99% yield, and which has an average degree of polymerization of about from 300 to 800, which contains about from 11.0% to 13.5% nitrogen, by weight, which is substantially completely soluble in acetone, and which is stable at 134.5° C. for about 17 minutes.

2. The process of claim 1 wherein the nitrating mixture is in the form of a liquid and its reaction with the cellulose is carried out at a temperature of about from −20° C. to 35° C.

3. The process of claim 1 wherein the nitrating mixture is in the form of vapor and its reaction with the cellulose is carried out at a temperature of about from 25° C. to 35° C.

4. A process of preparing a nitric acid ester of cellulose comprising reacting cellulose with a nitrating mixture obtained by combining about from 10% to 50%, by weight, of anhydrous nitrogen tetroxide with about from 90% to 50%, by weight, of anhydrous hydrogen fluoride, employing a ratio of about from 10 to 175 parts, by weight, of nitrating mixture to one part, by weight, of cellulose, at a temperature of about from −50° C. to 50° C., centrifuging the resulting wet nitric acid ester of cellulose to remove excess nitrating mixture, and then removing the residual amount of nitrating mixture adsorbed on the cellulose by evaporation at less than atmospheric pressure to obtain a nitric acid cellulose ester in a 97% to 99% yield, and which has an average degree of polymerization of about from 300 to 800, which contains about from 11.0% to 13.5% nitrogen, by weight, which is substantially completely soluble in acetone, and which is stable at 134.5° C. for about 17 minutes.

5. The process of claim 4 wherein the evaporation of the residual amount of nitrating mixture adsorbed on the cellulose is interrupted and removal of final traces of the nitrating mixture is accomplished by water drowning the cellulose ester and washing it to neutrality.

6. The process of claim 4 wherein acid-free nitric acid esters that are stable at 134.5° C. for at least 30 minutes may be obtained by subjecting them to a boiling treatment in hard water.

7. The process of claim 4 wherein the residual amount of nitrating mixture adsorbed on the cellulose is removed by sweeping it from the cellulose with a dry inert gas.

8. The process of claim 5 wherein acid-free nitric acid esters that are stable at 134.5° C. for at least 30 minutes may be obtained by subjecting them to a boiling treatment in hard water.

References Cited in the file of this patent

UNITED STATES PATENTS

| 1,283,617 | Andrews | Nov. 5, 1918 |
| 1,784,945 | Pinck | Dec. 16, 1930 |
| 2,400,287 | Caesar | May 14, 1946 |
| 2,432,280 | Caesar | Dec. 9, 1947 |

FOREIGN PATENTS

| 376,646 | Great Britain | July 14, 1932 |